United States Patent [19]

Wristers, deceased

[11] 4,330,433
[45] May 18, 1982

[54] TITANIUM TRIHALIDE CATALYST AND PROCESS FOR ITS PRODUCTION

[75] Inventor: Harry J. Wristers, deceased, late of Baytown, Tex., by Joy K. Wristers, executrix

[73] Assignee: Exxon Research & Engineering Co., Florham Park, N.J.

[21] Appl. No.: 225,213

[22] Filed: Jan. 15, 1981

Related U.S. Application Data

[63] Continuation-in-part of Ser. No. 125,400, Feb. 27, 1980, abandoned.

[51] Int. Cl.$^3$ ................................................ C08F 4/64
[52] U.S. Cl. ........................... 252/429 B; 252/429 C; 252/429 A; 526/119; 526/139; 526/141; 526/142; 526/144; 526/159
[58] Field of Search ............ 252/429 B, 429 C, 429 A

[56] References Cited

U.S. PATENT DOCUMENTS

| | | | |
|---|---|---|---|
| 3,412,174 | 11/1968 | Kroll | 252/429 C X |
| 3,905,915 | 9/1975 | Wristers | 252/429 C X |
| 4,060,593 | 11/1977 | Kazuo et al. | 252/429 A |
| 4,085,064 | 4/1978 | Wristers | 252/429 B |
| 4,182,691 | 1/1980 | Ueno et al. | 252/429 B |
| 4,183,826 | 1/1980 | Ueno et al. | 252/429 B |
| 4,200,717 | 4/1980 | Abe et al. | 252/429 B X |

*Primary Examiner*—Patrick Garvin
*Attorney, Agent, or Firm*—M. B. Kurtzman

[57] ABSTRACT

Polyolefin granules having an average particle size diameter greater than 600 microns, preferably about 1000 microns or greater are obtained by polymerizing monoolefins in the presence of a titanium catalyst having an average particle size diameter of greater than about 35 microns and preferably 40 to 65 microns. The titanium catalysts are obtained by reducing titanium tetrahalide in the presence of a suitable organometallic reducing compound such as diethylaluminum chloride under controlled conditions of temperature, reduction rate and concentrations to obtain a titanium halide reduced solids product seeds having an average particle size diameter of about 20 microns or greater and thereafter simultaneously and without interruption adding to the seeds containing system titanium tetrahalide and organometallic reducing compound such as diethyl aluminum halide at a rate such that the reduction of titanium tetrahalide to titanium trihalide is about $6 \times 10^{-4}$ to about 0.02 millimoles per liter per second per m$^2$ of available preformed titanium trihalide surface area until solids product of desired size are obtained.

68 Claims, No Drawings

TITANIUM TRIHALIDE CATALYST AND PROCESS FOR ITS PRODUCTION

CROSS REFERENCE TO RELATED APPLICATION

This application is a continuation-in-part of Ser. No. 125,400, filed Feb. 27, 1980 and now abandoned.

BACKGROUND OF THE INVENTION

1. Field of the Invention

This invention relates to titanium trihalide solids products having a narrow particle size distribution and an average particle size diameter greater than about 25 microns and preferably greater than about 35 microns. The invention further relates to the method of producing large particle size titanium trihalide solids products and activating the solids products to an active form of titanium trihalide useful for the polymerization of alpha-olefins such as propylene to highly stereoregular polyolefins granules having a narrow particle size distribution and an average particle size greater than about 600 microns and preferably about 1,000 microns or greater.

2. Description of the Prior Art

Traditionally olefin polymers are used as a material for the manufacturing of injection molded articles such as transport cases, buckets, and the like, and blow molded articles such as bottles, cans and the like. In these molding processes the olefin polymer is generally employed in the form of pellets. In order to obtain polyolefin pellets a pelletizing step is necessary.

Because of the increasing cost of energy it would be highly desirable to eliminate the pelletizing step. However, the polyolefin obtained from the polymerization reactors have heretofore been generally in the form of a powder having a wide particle size distribution, poor pourability and undesirable amounts of polymer powder fines therefor discouraging its use in the powder form as material for molding processes.

It is highly desirable that the molding industry be provided with polyolefin polymers in the form of polymer granules having a narrow particle size distribution, a substantial absence of polymer fines and having an average particle size diameter of 600 microns or greater and preferably about 1,000 microns or greater. The provision of such polyolefin granules would generally eliminate the requirements for a pelletizing step thereby resulting in an economic advantage to the industry as well as to the ultimate consumer.

It is well known in the art that there is a parallel relationship between the morphology of the polymer as obtained from the polymerization reaction vessel and the morphology of the catalyst employed during the polymerization process, that is to say, the polymer produced tends to replicate the catalyst particle size, shape and morphology. Therefore, in order to obtain polymer granules having a narrow particle size distribution and average particle diameter of about greater than 600 microns and preferably about 1,000 microns or greater directly from the reaction vessel a titanium halide catalyst manifesting a narrow particle size distribution and an average particle size diameter of about 35 microns or greater and preferably about 45 microns or greater should be employed.

The prior art discloses several methods for obtaining large particle size Ziegler-type catalyst. For example, in U.S. Pat. No. 3,905,915 of Wristers, issued Sept. 16, 1975, there is disclosed a process for producing titanium trichloride catalyst by first obtaining a finely-divided preformed solid "seed" catalyst and thereafter sequentially reducing titanium tetrachloride in the presence of a reducing agent. In order to obtain large titanium halide particles it is recommended that 3 or more sequential reduction steps be performed. Additionally, the rate of reduction is controlled by slowly raising the temperature of the system at a controlled rate until the temperature of about 25° C. is reached. The method results in the production of a layered catalyst particle due to the multiple reduction steps of titanium tetrachloride to titanium trichloride. Because of the layers, the catalyst particle as a whole is weak and easily broken into smaller particles under the preferred and normal chemical activation and polymerization conditions. The breakdown of the catalyst particle will result in the production of the undesirable polymer fines. Furthermore, polymer resins produced in the presence of the layered catalyst will readily disintegrate into smaller undesirable resin powders.

In U.S. Pat. No. 4,085,064 of Wristers, issued Apr. 18, 1978, there is disclosed a method for producing purple titanium trichloride with a molar excess of ethyl aluminum chloride and preferably ethyl aluminum dichloride. In Example 1, by controlling the rate at which temperature is raised during the production of the purple titanium trichloride there was obtained a catalyst having a wide particle size distribution of about 45 to 60 microns. The catalyst particles thus produced are more difficult to activate than the catalyst particle of this invention.

In U.S. Pat. No. 4,062,804 of Ueno et al, issued Sept. 13, 1977, and U.S. Pat. No. 4,127,504 and 4,127,505 of Ueno et al, each issued Nov. 28, 1978, the reduction of titanium tetrachloride in the presence of a mixture of diethylaluminum chloride and ethylaluminum dichloride to obtain the catalyst having a narrow particle size distribution is disclosed. The patent does not teach how to grow large size catalyst particles.

In British Pat. No. 1,393,430 of Van Der Bend, a method of preparing titanium trichloride catalyst particles having a narrow particle size distribution is disclosed. The process involves reduction of titanium tetrachloride by adding diethylaluminum monochloride to the titanium tetrachloride in the presence of particular amounts of monoethylaluminum dichloride. The growth of large size catalyst particles is not disclosed.

In Belgian Pat. No. 867054 there is disclosed a method of obtaining polymer particles having a narrow particle size distribution and reduced fines content. The improvement to the catalyst system consists in wetting the titanium trichloride with a mixture of alkanes and alkylbenzenes.

In U.S. Pat. No. 3,861,746 of Laffitte, issued June 24, 1975, there is disclosed a process for the production of hydrogen reduced titanium trichloride having an average particle size greater than 20 microns, preferably greater than 20 to 100 microns. The process for the production of the catalyst particle involves the crystallization of the titanium halide effluent from a reaction zone held at a temperature between 800° C. and 1,200° C.

In U.S. Pat. No. 4,077,903 of Wristers, issued Mar. 7, 1978 the reduction of titanium tetrachloride with a mixture of aluminum triethyl and aluminum diethyl chloride is accomplished at reduced temperatures and thereafter gradually elevating the temperature. Large particle size titanium trichloride was disclosed.

In U.S. Pat. No. 4,098,979 of Maemoto et al, issued July 4, 1978, there is disclosed a catalyst system comprising a catalyst component supported on a spheroidal particle of a high molecular weight carrier compound. The granule size distribution of the polymer obtained by polymerizing in the presence of the catalyst system is alleged to be controlled by controlling the particle size distribution of the carrier compound. Large size polyethylene granules are obtained by polymerizing in the presence of the catalyst system.

In U.S. Pat. No. 3,594,330 of Delbouille et al, there is disclosed the polymerization of alpha-olefins in the presence of a Ziegler-type catalyst deposited on a pulverulent support. The patentee teaches that when the support is in the form of microspheres the polymer is obtained by polymerizing in the presence of a catalyst in the form of small spheres.

It is apparent that it would be an advance in the state of the art to provide a simple method for the production of titanium halide catalyst particles which are substantially resistant to fracturing under normal activation and polymerization conditions, which evidence a narrow particle size distribution and large average particle size diameter, which process is simple and requires a minimum expenditure of energy.

SUMMARY OF THE INVENTION

In accordance with the present invention, a substantially non-friable, highly active Ziegler-type titanium halide catalyst component having a narrow particle size distribution and an average particle size diameter greater than 25 microns, desirably greater than 35 microns and preferably in the range of 40 to 60 microns or greater is obtained by adding a Ziegler-type organometallic reducing compound with stirring to a solution of titanium tetrahalide in a suitable diluent at a temperature of about $-50°$ C. to about $+10°$ C. and in a mole ratio of between about 1:3 to about 1.2:1 and at a rate such that the reduction of titanium tetrahalide to titanium trihalide is about 0.03 to about 0.2 millimoles per liter per second to obtain titanium trihalide solids product in the diluent having a narrow particle size distribution and an average particle size about or greater than 20 microns; and thereafter continuously and simultaneously adding with stirring to the titanium trihalide solids product in the diluent a Ziegler-type organometallic compound and titanium tetrahalide in a mole ratio of about 1:3 to about 1.2:1, the simultaneous addition being made at a rate such that the reduction of titanium tetrahalide to titanium trihalide is about $6 \times 10^{-4}$ to about 0.02 millimoles per liter per second per m$^2$ (where surface area here and in references to follow refers to that calculated from catalyst diameter, i.e., S.A.$=\pi$ (Diameter, catalyst)$^2$ and does not include any internal voids) of available preformed titanium trihalide surface area until solids product of desired size are obtained and thereafter recovering the titanium trihalide solids product.

In order for the solids product to be advantageously useful in the polymerization of alpha-olefins to stereoregular polymers, the solids product should be activated in order to induce crystal conversion to the highly active "purple" form of titanium trihalide.

The activation of the obtained titanium trihalide solids product can be accomplished by one of heat treatment at an activating temperature, contacting the titanium trihalides under activating conditions with a chlorinated hydrocarbon or contacting the titanium trihalides solids products under activating conditions with titanium tetrachloride.

The Ziegler-type organometallic reducing compounds which can be employed in the reduction of titanium tetrahalide to titanium trihalide can be an aluminum hydrocarbyl compound represented by an AlR$_3$, AlR$_2$X, AlRX$_2$ or R$_3$Al$_2$X$_3$, where an R is a hydrocarbyl group having from 1 to 18 carbon atoms and X is a halogen atom selected from fluorine, chlorine, bromine and iodine.

The activated titanium trihalide can be usefully employed in combination with an organometallic co-catalyst for the polymerization of olefins to highly stereoregular crystalline polyolefins.

In a preferred aspect of this invention, the strength of the reduced solids product is further improved by prepolymerizing a minor amount of alpha-olefin prior to activation or, in the alternative, after activation.

DETAILED DESCRIPTION OF THE INVENTION

The titanium trihalide-containing solids product having a narrow particle size distribution and a large average particle size diameter when activated in accordance with this invention has been discovered to provide a highly efficient catalyst system useful for polymerizing olefins to polymer granules of controlled size based on the morphology of the catalyst, said polymer granules being composed of highly stereo-regular polyolefin resin.

The titanium trihalide solids product is obtained in accordance with a two step process. In accordance with the first step, titanium tetrahalide is precipitated in a manner so as to form titanium trihalide seeds having an average particle size diameter of about 20 microns or greater and having a narrow particle size distribution. In accordance with this step by employing the conditions of this invention the number of the particles initially formed can be carefully controlled such that there are few fines produced. It is believed that during the seed forming step the titanium trihalide particles come together by agglomeration and, in the latter stage of the reaction, grow in size by an accretion mechanism. In the second step, which preferably follows the first step without interruption, titanium tetrahalide and an organometallic reducing compound are added continuously and simultaneously at a rate such that the titanium trichloride produced deposits and grows upon the seed formed in the first step. The addition of the transition metal halide and the organometallic reducing compound is controlled in a manner such that one can grow transition metals solids product as large as desired and preferably 35 microns or greater. It is believed that the second step, i.e., growth step involves the deposition of titanium halide crystallites onto available titanium surface by accretion.

The transition metal halides which can be employed in accordance with this invention are the titanium halides which are well known in the alpha-olefins polymerization art, such as, for example, titanium tetrachloride, titanium tetrabromide, titanium tetraiodide, titanium trichloride, titanium tribromide and titanium triiodide. Preferably the titanium halides employed in accordance with this invention will be the titanium chlorides.

The Ziegler-type organometallic reducing compounds which can be employed in accordance with this invention are the organometallic compounds of a metal of Group I to III of the Periodic Table and are also well known in the alpha-olefins polymerization art.

Preferably the organometallic reducing compounds will be an aluminum alkyl compound such as $AlR_3$, $AlR_2X$, $AlRX_2$, $R_3Al_2X_3$, wherein R and Y are as above. R can have from 1 to 18 carbon atoms and desirably is an alkyl or aryl group and preferably having from 1 to 6 carbon atoms. Most desirably R is ethyl and X is chlorine. Most preferably the organometallic compound employed in this invention is diethyl aluminum chloride and in the first step a certain amount of ethyl aluminum dichloride.

In accordance with the preferred aspect of this invention titanium trichlorides solids product having an average particle size diameter greater than 35 microns and a narrow particle size distribution are obtained by adding diethylaluminum chloride to a solution of titanium tetrachloride in a suitable diluent and preferably in the presence of particular amounts of added ethylaluminum dichloride. Preferably the ethylaluminum dichloride is premixed with the titanium tetrachloride prior to the addition of the diethylaluminum chloride, however, in the alternative all the added ethylaluminum dichloride can be added with the diethylaluminum chloride or some added diethylaluminum chloride can be premixed with the titanium tetrachloride solution prior to the addition of the diethylaluminum chloride, the remainder of the ethylaluminum dichloride being added with the diethylaluminum chloride.

It is believed that the ethylaluminum dichloride acts in a manner of a glue by tightly binding the titanium trichloride particles that are agglomerating to form a strong relatively non-friable seed particle. It is also believed that the presence of the ethylaluminum dichloride controls the number of seed particles initially formed thereby preventing the production of the undesirable amounts of titanium trichloride fines.

In accordance with a preferred aspect of this invention the growth step is continued without interruption after the formation of the seeds, however, the seeds can be, if desired, separated and washed prior to the growing of additional titanium trichloride onto the seeds to produce the large particle size solids product.

In accordance with this invention, the growth step involved with the simultaneous and continuous addition with stirring to the preformed titanium trichloride solids product in the diluent of diethylaluminum chloride and titanium tetrachloride is controlled such that the reduction of titanium tetrachloride to titanium trichloride is about $6 \times 10^{-4}$ to about $7 \times 10^{-3}$ millimoles per liter per second per m$^2$ of available preformed titanium trichloride surface area until the solids product of desired size are obtained.

The mole ratio of organoaluminum compound, i.e., total of diethylaluminum chloride and ethylaluminum dichloride to titanium tetrachloride employed in the seed growing step can be between about 0.9:1.0 to about 1.2:1.0, and desirably about 1.0:1.0 to about 1.2:1.0 and most preferably in a mole ratio of about 1:1.

The moles of added ethylaluminum dichloride per mole of diethylaluminum chloride can be from 0 to about 1.0. Preferably, the mole ratio of the dichloride to monochloride will be about 0.0:1.0 to about 1.0:1.0 and most preferably about 0.1:1.

As stated above, all the ethylaluminum dichloride can be added together with the diethylaluminum chloride. It is, however, desirable that some ethylaluminum dichloride be present with the titanium tetrachloride prior to the addition of the diethylaluminum chloride. Alternatively to employing added dichloride since ethylaluminum dichloride is produced in a solution as a result of the reaction of titanium tetrachloride with the diethylaluminum chloride the deliberate addition of ethylaluminum dichloride can be eliminated.

During the growth step, it is desirable that the diethylaluminum chloride and titanium trichloride be added in a mole ratio of about 0.1:1.0 to about 1.2:1.0 and desirably about 0.1:1.0 to about 1.1:1.0 and most preferably the mole ratio of diethylaluminum chloride to titanium tetrachloride will be about 1:1.

As indicated above, it is highly desirable that added ethylaluminum dichloride be present in the seed growing step at a mole ratio of ethylaluminum dichloride to diethylaluminum dichloride of from about 0.1:1.0 to about 1.0:1.0. Preferably the ethylaluminum dichloride will be premixed with the titanium tetrachloride in amounts such that about 1.0 to about 0.3 moles of added ethylaluminum dichloride will be present in the solution per mole of diethylaluminum chloride to be prior to the addition of diethylaluminum chloride. Most desirably, about 0.14 to about 0.2 moles of added ethylaluminum dichloride per mole of diethylaluminum chloride to be added can be in the solution prior to the addition of diethylaluminum chloride. However, in the alternative, all the ethylaluminum dichloride can be added with the diethylaluminum chloride to the titanium tetrahalide solution during the seed growing stage.

In accordance with this invention, it is important that the rate of reduction during the seed growing step be carefully controlled so as to prevent the production of new titanium trichloride nuclei. It is also believed that the titanium trichloride crystallites agglomerate in a manner so as to produce a highly strong solids seed product by controlling the the rate of addition of the organometallic compound. The organometallic compound should be added at a rate such that the reduction of titanium tetrahalide to titanium trihalide is about 0.03 to about 0.2 millimoles per liter per second, and preferably 0.08 millimoles per liter per second.

During the seed growing step, the desired temperature of the system is a function of the particular organometallic reducing compound employed. For example, should aluminum triethyl be employed for reducing the titanium tetrahalide to titanium trihalide it is desirable that the system be maintained at a temperature of about $-50°$ C. The temperature, therefore, can be in the range of about $-50°$ C. to about $+10°$ C. depending on the organometallic reducing compound employed. In the most preferred aspect of this invention where during the seed growth steps diethylaluminum chloride is employed for the reduction of titanium tetrachloride, the temperature should be about $-5°$ to about $+10°$ C. and preferably about $0°$ C.

During the growth step, the continuous and simultaneous addition of the titanium halides and Ziegler-type organometallic reducing compound should be maintained at a rate such that the reduction of titanium tetrahalide to titanium trihalide is about $6 \times 10^{-4}$ to about 0.02 millimoles per liter per second per meter squared of available preformed titanium trihalide surface area until the solids product of desired size is obtained. In accordance with the preferred aspects of this invention, titanium tetrachloride and diethylaluminum chloride are simultaneously and continuously added to the titanium trichloride solid product obtained in the seed growing step at the rate such that the titanium tetrachloride to titanium trichloride is about $6 \times 10^{-4}$ to about $7 \times 10^{-3}$ millimoles per liter per second per m² of available preformed titanium trichloride surface area and most preferably at a rate such that the reduction of titanium tetrachloride to titanium trichloride is about $2.5 \times 10^{-3}$ millimoles per liter per second per m² of available preformed titanium trichloride surface area.

The rate of reduction necessarily places constraints on the temperature of the system, the total length of growth time, and the rate of addition. Nevertheless, within the constraints it is desirable that the temperature be substantially the same as that applied during the seed growing step and in accordance with the preferred aspects of this invention about $-5°$ C. to $+10°$ C. and most desirably about $0°$ C.

The growth time can vary between about 10 and 25 hours. However, it was noticed that there is a strong dependence of fines production on the growth times. Essentially no fines generation was observed for growth runs of about 14 hours but for shorter and longer growth runs some fines were produced. The combination of the growth time and reduction rate will naturally determine the rate of addition of reagents such all being determined by the finally desired size of the solids product.

It is also necessary that the mixing and reduction during the seed growing and growth steps be carried out in a reaction vessel, the contents of which are stirred, i.e., agitated, at a rate so as to provide a stirring power which will keep the solids in uniform suspension without causing fracturing of the particles. Typically, such stirring power can be from about 3.0 milliwatts to about 2,600 milliwatts per liter.

The stirring power can be determined via measurements which are well known in the art. Typically, the measurement on the torque of the driving motor and the rotational speed of the stirrer can be determined in the way as described by J. H. Rushton et al, and Chem. Eng. Progress, 46 (1950) 395–404 and 467–477. Desirably the stirring rate should be such as to provide a stirring power of about 30 to about 300 milliwatts per liter, more desirably from about 30 to about 100 milliwatts per liter.

The stirring rate appears to be a function of the size as well as the geometry of the vessel in which the reduction and mixing takes place, as well as the shape and size of the stirrer means itself. Therefore, for each reaction vessel those of ordinary skill in the art can determine the most desirable stirring rate as well as the size of the stirrer medium in order to avoid excess production of fines. Stirring or agitation can be accomplished by means well known in the art, e.g., stirring paddles, recirculation and the like.

Upon completion of the growth step it is desirable prior to recovering the titanium trihalide solid product to age the system anywhere from about 5 minutes to about 2 hours at the same temperature in which the mixing and reduction takes place. Upon completion of the aging, the temperature of the system can be gradually elevated to a temperature of about $20°$ C. to about $100°$ C. over a period of time of from about 1 to 2 hours. Most preferably, aging is carried out by holding the reaction mixture at the reduction temperature for about ½ hour to about 2 hours and then gradually elevating the temperature up to about $50°$ to $75°$ C. and preferably about $65°$ C. and holding at the elevated temperature for about one hour. The rate of temperature elevation is desirably about $1°$ C. per minute.

Caution should be taken during aging to prevent the titanium trichloride solids product from being subjected to conversion of the titanium trichloride solids product to a more crystalline form. For example, by subjecting the titanium trichloride solids product to too high a temperature or aging for a prolonged period of time, crystal conversion can occur.

The diluents employing during the mixing and reduction steps are preferably alkanes having from about 4 to 10 carbon atoms, for example, n-butane, n-pentane, n-hexane, 2,2-trimethylpentane, decane, isomers of these alkanes or mixtures of said alkanes. Most desirably, the diluent will have from about 4 to 7 carbon atoms.

The so obtained reduced solids product, for example, the titanium trichloride reduced solids product is an amorphous solid having a complicated composition comprising, as a main component, titanium trichloride and an aluminum compound derived from the organoaluminum compound employed in the reduction. This composition varies depending upon the exact reducing methods and conditions. Where titanium tetrachloride is reduced with a mixture of DEAC and EADC, it comprises, as a main component, titanium trichloride and EADC and, in addition, aluminum compounds in various forms, the proportion of aluminum being about 0.2 gram atoms or more to 1 gram atom of titanium.

The so obtained reduced solid product contains titanium trichloride of the beta-type and is generally brown to red-violet in color, depending upon specific reduction conditions employed.

The large particle size reduced solids of this invention in order to be commercially useful for efficiently polymerizing alpha-olefins and preferably to highly stereoregular polyolefins should be activated, i.e., subjected to conditions which will cause the solids product to undergo crystal conversion from the less active form (i.e., the beta-type) to the more active form generally described as purple titanium halide.

Prior to activation it is preferable to subject the reduced solids product to prepolymerization as described hereinafter. However, the reduced solids product which is activated to the active form of titanium halide can be readily and advantageously employed as an alpha-olefin polymerization catalyst.

The titanium trichloride reduced solid obtained, as described above, can be prepolymerized, i.e, contacted with a polymerizable alpha-olefin under polymerization conditions, directly without the addition of a reducing co-catalyst or it can be separated, washed in an inert solvent or diluent, if desirable, and then prepolymerized with or without addition of a co-catalyst (aluminum alkyl) as it is or after drying in a conventional manner.

In accordance with this invention the alpha-olefins which can be employed in the prepolymerization step can have from 2 to 22 and desirably 3 to 8 carbon atoms. However, an alpha-olefin mixture having from 10 to 46 carbon atoms can also be employed. In accordance with a preferred embodiment of the invention, the alpha-olefins will contain no branching on the vinylic carbon atoms. Illustrative of alpha-olefins which can be employed in accordance with this invention during the prepolymerization step are ethylene, propylene, butene-1, pentene-1, hexene-1, heptene-1, 4-methyl-pentene-1 and the like. Preferably the alpha-olefin will contain from 3 to 6 carbon atoms and most preferably the alpha-olefin will be propylene.

The temperature of the reaction mixture during the alpha-olefin application can be from about 0° C. to 100° C. preferably 25° C. to about 60° C. and most preferably from about 30° C. to about 40° C. As in the aging step, prepolymerization conditions should be such as to prevent conversion of the reduced solid to a more crystalline form.

The alpha-olefin employed in accordance with the present invention for the prepolymerization of the titanium trichloride reduced solid can be added directly to the reaction product of the reduction step or it can be added to the washed reaction product in a suitable solvent. The amount of alpha-olefin employed can be in a mole ratio per total titanium halide reduced solid employed in a range of about 0.03 to 3000 times, and particularly at about 0.1 to 0.5 times. The mole ratio employed, therefore, will desirably provide a titanium halide prepolymerized with about 1 to 1,000 wt.% of alpha-olefin based on the titanium halide and desirably from about 3 to about 100 wt.% and most preferably from about 6 to 30 wt.% of alpha-olefin based on the weight of titanium halide.

The time period over which the alpha-olefins can be allowed to react with the reduced solids is desirably in a range of about 1 minute to about 180 minutes, preferably in a range of 10 to about 120 minutes and most preferably about 30 minutes. The times will be functions of the temperatures employed, the alpha-olefins employed as well as the degree of prepolymerization desired. Hence, the actual time employed would be determined by the artisan, the determination being well within the skill of the artisan.

Upon completion of prepolymerization the titanium trichloride reduced solid now prepolymerized with a minor amount of alpha-olefin is filtered and washed with an inert organic solvent so as to remove any reaction by-products.

In accordance with this invention, the prepolymerized titanium trichloride reduced solids obtained will manifest essentially no change in crystalline structure.

The prepolymerized reduced solid can be employed as a non-friable polymerization catalyst component.

By so encapsulating the reduced solids particles in a polymer matrix the particles are strengthened to resist mechanical attrition, to resist particle breakup to fines during the activation step. Unexpectedly, the prepolymerization, performed in accordance with this invention does not cause agglomeration of the catalyst particles but desirably allows the catalyst particles to retain their shape during activation and throughout any further polymerization reactions. These advantages are obtained even when the catalysts are employed in harsh solvents such as toluene.

The prepolymerized titanium trichloride reduced solid product can, in accordance with a preferred aspect, be activated to a highly active crystalline prepolymerized product by heat activation, by contacting the prepolymerized product with a chlorinated hydrocarbon in combination with a Lewis base complexing agent, a Lewis acid in combination with a Lewis base complexing agent or in accordance with the teachings contained in U.S. Pat. No. 4,151,112, issued Apr. 24, 1979, the combination of a chlorinated hydrocarbon, a Lewis acid, such as $TiCl_4$ and a Lewis base complexing agent. In accordance with this invention it is preferable to employ the chlorinated hydrocarbon in combination with the Lewis base complexing agent.

As illustrative of the chlorinated hydrocarbons which can be employed in accordance with this invention are hexachloroethane, pentachloroethane, tetrachloroethane, trichloroethane, dichloroethane, monochloroethane, tetrachloroethylene, trichloroethylene, dichloroethylene, chloroethylene, octachloropropane, heptachloropropane, hexachloropropane, pentachloropropane, tetrachloropropane, trichloropropane, dichloropropane, monochloropropane, tetrachlorobutane, trichlorobutane, dichlorobutane, trichlorobutane, trichloropentane, dichloropentane, dichlorohexane, dichloroheptane, dichlorooctane, dichloropropene, trichloropropene and dichlorobutene.

A variety of chlorinated hydrocarbons can be employed during activation, e.g., the chlorinated products of aliphatic and aromatic hydrocarbons. The chlorinated products of the aliphatic saturated hydrocarbons are generally more effective. Desirably the chlorinated aliphatic hydrocarbons will have from about 2 to 8 carbon atoms and from about 2 to 6 chlorine atoms per molecule. The most preferred chlorinated hydrocarbons are the chlorinated ethanes. The effect of the chlorinated hydrocarbons appears to increase with the increased number of chlorine atoms per molecule desired. Desirably, therefore, the chlorinated hydrocarbons employed can be one of hexachloroethane, pentachloroethane, tetrachloroethane, trichloroethane. Most preferably the chlorinated hydrocarbon will be hexachloroethane.

The Lewis base complexing agent which can be employed in accordance with this invention will desirably contain at least one electron donating atom or group in the molecule and will preferably be one of an ether, ester, ketone, thioester, organophosphoric compound or organonitrogen compound or mixtures of these compounds. Most desirably the Lewis base complexing agent will be a dialkyl ether such as, for example, diethyl ether, diisopropyl ether, di-n-butyl ether, diisobutyl ether, diisoamyl ether, di-2-ethylhexyl ether, di-2-ethylheptyl ether, allyl ethyl ether, allyl butyl ether, diphenyl ether, anisole, penetole, chloroanisole, bromoanisole, dimethyloxy benzene and the like.

Useful examples of the thioethers are diethyl thioether, di-n-propyl thioether, dicyclohexyl thioether, diphenyl thioether, ditolyl thioether, ethylphenyl thioether, propylphenyl thioether, diallyl thioether and the like. Useful examples of the organophosphorous compounds which can be employed in accordance with this invention are tri-n-butyl phosphine, triphenyl phosphine, triethyl phosphite, tributyl phosphite and the like. Useful examples of the organonitrogen compounds are diethyl amine, triethyl amine, n-propyl amine, di-n-propyl amine, tri-n-propyl amine, aniline, dimethylaniline and the like. As indicated above, the ethers are most preferably employed and, above all, are dialkyl ethers, preferably the alkyl groups containing from 4 to 8 carbon atoms. Most preferred are dialkyl ethers containing 4 or 5 carbon atoms. The ethers so employed can be symmetrical or asymmetrical ethers and, hence, the alkyl groups are selected from the group consisting of n-butyl, isobutyl, n-amyl, isoamyl, 2-methylbutyl and 2-ethylpropyl. Most preferably di-n-butyl ether and diisoamyl ether and n-butyl isoamyl ether are employed in accordance with this invention as a Lewis base complexing agent to be used in combination with the halogenated hydrocarbon.

In accordance with the present invention one may employ a Lewis acid in place of or in combination with the halogenated hydrocarbon. The Lewis acids which can be used are selected from the halides of Group II or Group VII metals and halides of silica or boron. Illustrative of the Lewis acids which can be employed are, for example, $MgCl_2$, $MnCl_4$, $AlCl_3$, $FeCl_3$, $TiCl_4$, $VCl_4$, $NiCl_2$, $CoCl_2$, $BCl_3$, $BF_3$, $SiCl_4$. The preferred Lewis acid is $TiCl_4$.

The amount of Lewis acid employed in accordance with this invention can be from about 0.05 to about 50 times that of the weight of the prepolymerized titanium halide and preferably is from about 0.45 to about 15 times.

The proportion of Lewis base complexing agent employed is preferably between 0.1 to 2.5 moles, and especially between 0.5 and 1.8 moles, per mole of $TiCl_3$ present in the reduced solid. About 1 mole Lewis base per mole of $TiCl_3$ present in the reduced solid gives particularly good results.

In accordance with the present invention the activation step, i.e., the conversion of the prepolymerized reduced solid to a highly crystalline form of titanium trichloride is accomplished by contacting the prepolymerized reduced solid with either chlorinated hydrocarbon and Lewis base complexing, the Lewis acid and Lewis base complexing agent or the combination of the chlorinated hydrocarbon, Lewis acid and Lewis base. The contacting can be carried out by adding the prepolymerized reduced solid to an inert solvent or diluent, such as previously described so as to prepare a suspension and then adding, for example, the ether and hexachloroethane, thereto in order; by adding the ether to the prepolymerized reduced solid to prepare a suspension and then adding thereto hexachloroethane as a solution of hexachloroethane in the ether or an inert solvent; or by adding the prepolymerized reduced solid to a mixed solution of the ether and hexachloroethane or a mixed solution of ether, hexachloroethane and an inert solvent. The most convenient and favorable method consists in suspending the reduced solid in an inert solvent and then adding a mixture of ether, hexachloroethane and an inert solvent to the suspension. When employing both halogenated hydrocarbon and Lewis acid it is desirable that they be added simultaneously.

In accordance with the present invention the chlorinated hydrocarbon such as hexachloroethane and the ether can be in a mole ratio to the titanium halide in the reduced solid of about at least 0.2 mole or more of chlorinated hydrocarbon preferably 0.1 mole to about 2.5 moles of ether and 0.5 to 1.5 moles of hexachloroethane. Greater or lesser ratios can be employed. However, the most desirable effects are obtained by employing the so stated specific mole ratios.

Moreover, the effects of the present invention are somewhat reduced if the prepolymerized reduced solid is contacted with the hexachloroethane or halogenated hydrocarbon prior to contacting the reduced solid with the ether. The treatment with ether and hexachloroethane appears together to provide a synergistic effect resulting in a catalyst having surprisingly excellent catalytic performances.

In accordance with the present invention the chlorinated hydrocarbon is employed in an amount of about 0.2 moles to about 3.0 moles per gram atom of titanium in the prepolymerized reduced solid and preferably the chlorinated hydrocarbons will be in the range of about 0.5 moles to about 1.5 moles, particularly in the range of about 0.6 moles to about 1.2 moles per 1 gram atom of titanium in the prepolymerized reduced solid. Greater amounts of chlorinated hydrocarbon can be employed. However, no benefit is obtained therefrom. Lesser amounts of chlorinated hydrocarbon results in a less active catalyst.

The activation step is carried out at a temperature of about 50° C. to about 100° C. for a period of time of about 1 to 10 hours. Utilization of temperatures outside these ranges can be employed. However, activity of the catalyst appears to be best when the specified temperatures are employed. Most preferably, activation is carried out with the chlorinated hydrocarbon and ether at a temperature of about 80° C. to about 90° C. for about 3 to about 7 hours. Upon completion of the activation step the so obtained prepolymerized titanium trichloride catalyst composition is separated from the solvent, washed with an inert solvent or diluent and optionally dried in conventional manners. During the treatment step, the titanium halide of the reduced solid is converted whereby the so obtained titanium trichloride catalyst contains predominantly titanium trichloride of the delta-type, according to the classifications generally adopted (Journal of Polymer Science, 51, 1961, pp. 399–410). The so obtained titanium trichloride catalyst has a violet to purple color.

The activated forms of the large particle size catalyst prepared according to the invention is used for the polymerization of olefins in accordance with known procedures. Generally, it is contacted with an organometallic compound co-catalyst of a metal of Group I to III of the Periodic table, particularly an organoaluminum compound such as, for example, monoalkylaluminum dichloride, dialkylaluminum monochloride, aluminum sesquihalide or trialkylaluminum. One may also employ various compounds, for example, complexing agents such as ethers, amines or amides as well as phosphorous-containing compounds and nitrogen to further improve the catalyst system.

The stereospecific polymerization of alpha-olefins can be carried out in accordance with any of the procedures well known in the art such as, for example, in a gas phase process, in a process employing an inert hydrocarbon diluent and most preferably in a process where the polymerizable monomer is employed as the diluent.

The catalyst system for the polymerization of alpha-olefins employing the titanium trichloride catalyst of the present invention is exceedingly useful to polymerize alpha-olefins such as ethylene, propylene, butene-1, methyl butene-1, pentene-1, 3-methyl pentene-1, 4-methyl pentene-1, hexene-1 and mixtures thereof and gives uniform polymer granules, having a narrow particle size distribution and an average particle size diameter of about 600 microns or greater and preferably 1000 microns or greater such as 1000 to 2000 microns.

The present invention will be illustrated by the following examples.

EXAMPLE 1

This example illustrates a method of obtaining a large size $TiCl_3$ solids product.

To a standard three necked one liter baffled flask containing a stirring paddle there is added 100 ml of dry hexane and 100 ml of solution of 3 M $TiCl_4$ in dry hexane. The solution was cooled to 0° C. and stirred. To the cooled solution there is added slowly and with constant stirring over a 30 minute period 10 ml of 3 M EADC in dry hexane while maintaining the temperature at 0° C. A clear pale yellow solution is obtained. To the clear solution maintained at 0° C. there was added 3 M DEAC in dry hexane at the rate of 20 ml/hr. for a period of 5 hours. There is obtained $TiCl_3$ solids product seeds having an average diameter of $26\mu$ and a narrow particle size distribution with essentially no production of $TiCl_3$ solids product fines. Upon completion of the seed formation there is simultaneously added to the flask dry hexane solutions of 3 M $TiCl_4$ and 3 M DEAC each at the rate of 10.6 ml/hr. for a period of 23.25 hours. During the simultaneous addition the contents of the flask is constantly stirred and maintained at 0° C. Upon completion of the simultaneous addition the contents of the flask are held at 0° C. for 30 minutes and then warmed to 65° C. at the rate of 1°/min. and held at 65° C. for 1 hour. There was obtained $TiCl_3$ solids product having an average diameter of $41.1\mu$ and narrow particle size distribution. The $TiCl_3$ solids product evidenced little propensity to mechanical failure when subjected to crushing under a microscope slide.

EXAMPLE 2

This example illustrates that the stirring rate has an effect on the size of the seed particles.

In each of four one liter baffled flasks $TiCl_3$ solids product seed were grown identically as in Example 1, except that the stirring rates were different for each run. The stirring paddles in each flask were 7.8 cm by 2.0 cm. The particle size distribution and average particle size diameter of the $TiCl_3$ solid product was measured. The results are summarized in Table I.

TABLE I

| rpm | P.S.D.[1] | $D\mu^2$ |
| --- | --- | --- |
| 250 | narrow | 20.6 |
| 200 | narrow | 21.3 |
| 175 | narrow | 27.5 |
| 150 | broad | 29.0 |

[1]Particle size distribution
[2]Average particle size diameter

The results demonstrate that for a particular vessel there is an optimum stirring rate. Nevertheless, it has been realized that there is no correlation between stirring rates and vessel geometry. For any vessel the determination of optimum stirring rates and paddle sizes are with the skill of the practitioners in the art.

EXAMPLE 3

This example illustrates the benefits of the use of EADC during the $TiCl_3$ solids product seed growing procedure.

To a one liter baffled flask containing a 7.3×2.0 cm stirring paddle there is added 100 ml of dry hexane and 100 ml solution of 3 M $TiCl_4$ in dry hexane. The solution was cooled to 0° C. and stirred at the rate of 175 rpm for 15 minutes. To the solution maintained at 0° C. was added at a constant rate over 30 minutes a 10 ml solution of 3 M EADC in dry hexane. A clear pale yellow solution was obtained. To the clear solution there is added under constant stirring at 175 rpm and at a constant rate of 20 ml/hr. for a period of 5 hours 3 M DEAC in dry hexane while maintaining the temperature at 0° C. Upon completion of the DEAC addition there was observed large particles of $TiCl_3$ solids product seeds of substantially narrow particle size distribution.

In a second one liter baffled flask $TiCl_3$ solids product seeds were prepared identically as in the first flask with the exception that the addition of EADC was eliminated.

Portions of $TiCl_3$ solids product catalyst seeds from each flask were measured by counting photomicrographs. The results summarized in Table II show that the presence of EADC during the seed growing step results in a significantly narrower particle size distribution of solids seed product.

TABLE II

| EADC Addition | | No EADC | |
| --- | --- | --- | --- |
| #$TiCl_3$ particles | $\overline{D}\mu^1$ | #$TiCl_3$ particles | $\overline{D}\mu^1$ |
| 61 | 24 | 22 | 28 |
| 6 | 10 | 21 | 14.6 |

[1]Average particle size diameter

EXAMPLE 4

This example illustrates the effect of growth time on the particle size distribution of the $TiCl_3$ solids product.

To a standard 3-necked one liter baffled flask containing a 7.8×2.0 cm stirring paddle there was added 133 ml of dry hexane and 133 ml 3 M $TiCl_4$ in dry hexane. The solution was cooled to 0° C. and stirred at 175 rpm for 15 minutes. To the cooled solution there is added at a constant rate 7 ml of 3 M EADC over a period of 21 minutes with stirring while maintaining the contents of the flask at 0° C. A pale yellow solution was observed.

To the pale yellow solution while stirring at 175 rpm there was added 98 ml of 4.5 M DEAC at a constant rate for a period of 5 hours. A representative sample of the $TiCl_3$ solids product seeds was measured. A plot of the log particle size vs. the weight percent particles of less than a particular size showed a single distribution with a narrow size distribution as evidenced by the slope of said plot.

To the flask there is added simultaneously 301.7 ml of 4.5 M DEAC and 155.4 ml of 7.97 M $TiCl_4$ in dry hexane at a rate of about 14.4 ml/hr. and 7.8 ml/hr. respectively. The flask was maintained at 0° C. and the contents stirred at 175 rpm.

Samples were withdrawn from the reaction mixture at 7, 14 and 21 hours reaction for evaluation of particle size and size distribution by the counting of photomicrographics. Samples of $TiCl_3$ solids growth product from the flask as a function of time were measured, the log of the particle size vs. percent finer than selected particle size (wt. basis) for each time interval was plotted. The plot of the 21 hour $TiCl_3$ growth product showed a binodal distribution wherein about 13 wt.% of the reduced solids were significantly smaller in size than the rest of the product. The 14 hour $TiCl_3$ growth product showed a mononodal relatively narrow distribution curve and the 7 hour growth product also showed a narrow mononodal distribution but of lesser mean size than the 14 hour sample. The results would evidence that growth step is preferably performed in about 14 hours.

EXAMPLE 5

This example illustrates the effect of rate of reduction of $TiCl_3$ in the growth step on the particle size and distribution of the derived reduced solids.

To each of three standard 3-necked one liter baffled flasks containing a 7.8×2.0 cm stirring paddle there was added 80 ml of 3 M TiCl$_4$ in hexane plus 219 ml of dry hexane. The solutions were cooled to +5° C. and stirred at 175 rpm.

To each of the respective stirred solutions was added 80 ml of a 50/50 (vol./vol.) mixture of 3 M DEAC and 3 M EADC both in hexane over a period of five hours. A representative sample of the TiCl$_3$ solids product seeds were measured by photomicroscopy. The seed material of each flask was found to be $\approx 31\mu$ in diameter and relatively narrow in particle size distribution. Each flask was then cooled to 0° C.

With the flasks at 0° C. there is added simultaneously 145.6 ml of 7.97 M TiCl$_4$ in hexane and 257.6 ml of 4.5 M DEAC in hexane. Each flask was maintained at 0° C. and stirred at 175 rpm.

In Flask I the simultaneous addition was complete in 14 hours, in Flask II, 7 hours and in Flask III, 3.5 hours. Upon completion of the simultaneous addition the contents of each flask was held at 0° C. for two hours, warmed to 65° C. at the rate of 1° C./minute, and held at 65° C. for one hour. Samples of TiCl$_3$ solids growth product from each flask was measured via photomicroscopy with the results shown below:

|  | Flask I (14 hr. growth) | Flask II (7 hr. growth) | Flask III (3.5 hr. growth) |
| --- | --- | --- | --- |
| Mean Size large particle ($\mu$) | 48 | 50 | 55 |
| $\sigma$ large particles ($\mu$) | 1.30 | 1.20 | 1.08 |
| Mean size small particles ($\mu$) | 20 | 32 | 30 |
| $\sigma$ small particles ($\mu$) | 1.50 | 1.25 | 1.12 |
| Wt. fraction large particles | 0.95 | 0.60 | 0.60 |

The results would evidence that in order to prevent significant nucleation of new particles and, hence, a large population of smaller growth product, it is necessary to reduce the rate of formation of TiCl$_3$ in the growth steps to an acceptably low level.

EXAMPLE 6

1. Seed Growing Step

To a 3-necked, 1 liter baffled flask maintained at 0° C. containing a 7.8×2.0 cm stirring paddle there was added with stirring 241 ml of dry hexane, 80 ml of 3 M TiCl$_4$ in dry hexane and thereafter at a constant rate over 12 minutes, 4 ml of 3 M EADC. A pale yellow solution was obtained. To the pale yellow stirred solution held at 0° C. was added at a constant rate for 5 hours, 53 ml of 4.5 M DEAC. TiCl$_3$ solids product seed having an average particle size diameter of 28$\mu$, a narrow particle size distribution and the substantial absence of particle fines were obtained.

2. Growth Step

To the flask containing the TiCl$_3$ solids product seeds is added 8 ml of 3 M EADC over 24 minutes followed by the simultaneous addition of 145.6 ml of 7.97 M TiCl$_4$ and 257.6 ml of 4.5 M DEAC. The simultaneous addition was maintained at a constant rate for 14 hours while stirring the flask at 175 rpm and controlling the flask contents temperature at 0° C. Upon completion of the simultaneous addition the contents were held for 2 hours at 0° C., warmed to 65° C. at the rate of 1° C./min. and held at 65° C. for one hour. TiCl$_3$ solids product catalyst particles having an average particle size diameter of 45$\mu$ with a narrow particle size distribution ($\sigma=1.3$) were obtained along with a minor ($\approx$wt. %) smaller particle size fraction. X-ray studies revealed a brown $\beta$-type TiCl$_3$ solids product.

3. Prepolymerization Step

To a one liter baffled flask containing 300 ml of purified hexane there was added 75 g of washed TiCl$_3$ solids product. The flask was placed in a bath and held at a temperature of 38° C. The flask was purged with nitrogen and thereafter purged of nitrogen by purging with propylene for five minutes. During the propylene purge, the TiCl$_3$ solids product was maintained in a quiescent position. After purging 10 gm propylene is passed through the stirred slurry maintained at 38° C. at a constant rate for 77 minutes providing a prepolymerized TiCl$_3$ solids product. Upon completion of prepolymerization, the prepolymerized solids product was examined under an optical microscope and by x-ray diffraction techniques. The x-ray study revealed no change in the crystalline structure of the TiCl$_3$ solids product.

4. Activation of TiCl$_3$ Solids Product 10 g of the prepolymerized TiCl$_3$ solids product and 16 ml of pure n-nonane are added to a 240 ml pressure bottle and heated to 65° C. 24 ml of a prepared solution containing 65.1 g of n-butyl ether and 104.2 g C$_2$Cl$_6$ diluted to 250 ml with n-nonane is rapidly added to the bottle. The contents of the bottle is raised to 85° C. at a constant rate over 15 minutes and held at 85° C. for 5 hours. Thereafter the contents are cooled to room temperature and washed with boiling hexane 4 times on a fritted glass filter. An examination of the prepolymerized TiCl$_3$ solids product showed no evidence of fracturing and x-ray analysis revealed TiCl$_3$ solids product had undergone crystal conversion to the purple $\delta$ type.

5. Propylene Polymerization

To a one liter reactor there was added 6.0 ml of 2 wt.% DEAC in purified heptane and 500 ml of propylene. The reactor was heated to 70° C. and 0.05 g of the prepolymerized activated TiCl$_3$ solids product was flushed into the reactor with 350 ml of propylene. The reactor was maintained at 70° C. for 4 hours, the pressure being maintained at about 460 psi with the addition of 250 ml propylene 2 hours after the reaction run was initiated. 498 g of 96.0% heptane insoluble polypropylene was obtained. The polypropylene granules had an average particle diameter of 1030$\mu$ and coefficient of variance of 0.29, indicating a narrow particle size distribution. The catalyst efficiency was 13,636 g pp/g catalyst.

EXAMPLE 7

This example is illustrative of the prior art disclosed in U.S. Pat. No. 3,905,915.

To a 1000 ml baffled flask containing a 7.8×2.0 cm stirring paddle rotating at 175 rpm there was added 100 ml of 3 M TiCl$_4$ and 100 ml of dry hexane. The flask contents were cooled to 0° C. and held at 0° C. for 15 minutes. To the solution there was added 10 ml of 3 M EADC at a constant rate over a 30 minute period. To the clear solution there was added 100 ml of 3 M DEAC over a 5 hour period. TiCl$_3$ solids product seeds having an average particle size diameter of 25.3$\mu$ were obtained. The system was thereafter cooled to −50° C., warmed slowly to −45° C. 200 ml of 3 M TiCl$_4$ and 200 ml of 3 M DEAC were added simultaneously to the system over a time period of one hour, 15 minutes while maintaining the temperature between −45° C. and −40° C. The system was then warmed to room temperature at the rate of 2.9° C./hr.

The growth particles were sampled and compared with growth particles prepared in the manner similar to Example 1.

The sample prepared in accordance with this example showed 13 particles of about 35.6μ in diameter and 52 particles of about 15.9μ in diameter, whereas the sample prepared in a manner similar with Example 1 showed 18 particles of about 37.5μ in diameter and 31 particles of about 8.9μ in diameter.

Using the formula:

$$\text{wt. \% large particle} = \frac{(D_L)^3 \times N_L}{([(D_L)^3 \times N_L] + [(D_S)^3 \times N_S])}$$

wherein $D_L$ is the diameter of the large size particles, $N_L$ is the number of large size particles, $D_S$ is the diameter of the small size particles and $N_S$ is the number of small size particles. By employing the method of the prior art, one obtains 74% large particles compared with 98% when employing the method of this invention.

EXAMPLE 8

This example illustrates that EADC and DEAC can be added together during the seed growing step.

To a standard one liter baffled flask containing a stirring paddle there is added 100 ml 3 M TiCl$_4$ and 100 ml dry hexane. The solution is cooled to 0° C. Three additional solutions are identically prepared. To the first flask there is added 10 ml of 3 M EADC over a 30 minute period and thereafter at a constant rate for 5 hours, 100 ml of 3 M DEAC. TiCl$_3$ solids products seeds having an average particle size of 22μ were obtained.

To the second flask was added at a constant rate for 5 hours and at 0° C. 100 ml hexane solution comprising 70 ml of 3 M DEAC and 30 ml of 3 M EADC. TiCl$_3$ solids products seed having an average diameter of 24.6μ were obtained.

To the third flask was added at a constant rate over 5 hours and at 0° C. 100 ml hexane solution comprising 50 ml of 3 M DEAC and 50 ml of 3 M EADC. TiCl$_3$ solids product seed of average particle size diameter of 34.3μ were obtained. To the fourth flask was added at a constant rate over 5 hours and 0° C. 100 ml of hexane solution comprising 30 ml 3 M DEAC and 70 ml 3 M EADC. TiCl$_3$ solids product seeds of average particle size diameter of about 36μ were obtained. It was also observed that not only increased particle size products were obtained by adding EADC with DEAC during the formation of the seeds product, but additionally with increasing particle size diameter, there was little or no increase in the particle size distribution.

What is claimed is:

1. A process for producing titanium trihalide solids product having an average particle size diameter greater than 35 microns and a narrow particle size distribution comprising:
   (a) adding an organometallic reducing compound with stirring to a solution of titanium tetrahalide in a suitable diluent at a temperature of about −50° C. to about +10° C., in a mole ratio of between about 1:3 to about 1.2:1 and at a rate such that the reduction of titanium tetrahalide to titanium trihalide is about 0.03 to about 0.2 m moles per liter per second to obtain titanium trihalide solids product in the diluent having a narrow particle size distribution and an average particle size greater than about 20 microns;
   (b) continuously and simultaneously adding with stirring to the titanium trihalide solids product in the diluent an organometallic reducing compound and titanium tetrahalide in a mole ratio of about 1:3 to about 1.2:1, the simultaneous addition being made at a rate such that the reduction of titanium tetrahalide to titanium trihalide is about $6 \times 10^{-4}$ to about 0.02 m moles per liter per second per m$^2$ of available preformed titanium trihalide surface area until solids product of desired size are obtained, and
   (c) recovering titanium trihalide solids product.

2. The process of claim 1 wherein step (a) is followed by step (b) without interruption.

3. The process of claim 1 wherein the titanium tetrahalide is titanium tetrachloride and the organometallic reducing compound is one of AlR$_3$, AlR$_2$X, AlRX$_2$ or R$_3$Al$_2$X$_3$, wherein R is a hydrocarbyl group having from 1 to 18 carbon atoms and X is a halogen atom.

4. The process of claim 3 wherein R is an alkyl or aryl group having from 1 to 6 carbon atoms and X is chlorine.

5. The process of claim 4 wherein R is ethyl.

6. A process for producing TiCl$_3$ solids product having an average particle size diameter greater than 35μ and a narrow particle size distribution comprising:
   (a) adding R$_2$AlX or mixtures thereof with RAlX$_2$ slowly and with stirring to a solution of titanium tetrachloride in a suitable diluent at a temperature from about −5° C. to about +10° C. and based on total moles of organoaluminum compound per mole titanium tetrachloride in a mole ratio of between about 0.9:1.0 to about 1.2:1.0 and in the presence of about 0 to about 1.0 mole of added RAlX$_2$ per mole of R$_2$AlX, 0.0 mole to all of added RAlX$_2$ being in solution with titanium tetrachloride prior to the addition of R$_2$AlX the remainder of the added RAlX$_2$ being added with R$_2$AlX to the titanium tetrachloride solution, wherein R is a hydrocarbyl group having from 1 to 18 carbon atoms and X is a halogen atom, the rate of addition of the R$_2$AlX to the titanium tetrachloride solution being controlled to maintain the reduction of titanium tetrachloride to titanium trichloride at about 0.03 to about 0.2 m mole per liter per second whereby there is obtained titanium trichloride solids product in the diluent having a narrow particle size distribution and an average particle size greater than about 20μ;
   (b) slowly simultaneously and continuously adding with stirring to the titanium trichloride solids products in the diluent R$_2$AlX or mixtures thereof with RAlX$_2$ and titanium tetrachloride at a mole ratio based on total moles organoaluminum compound per mole titanium tetrachloride of about 0.1:1.0 to about 1.2:1.0; wherein R and X are as defined above, and wherein the stimultaneous and continuous addition is at a rate such that the reduction of titanium tetrachloride to titanium trichloride is about $6 \times 10^{-4}$ to about $7 \times 10^{-3}$ m moles per liter per second per m$^2$ of available preformed titanium trichloride surface area until solids product of desired size are obtained; and (c) recovering titanium trichloride solids product.

7. The process of claim 6 wherein added RAlX$_2$ is present in step (a).

8. The process of claim 6 wherein step (a) is followed by step (b) without interruption.

9. The process of claim 6 wherein X is chlorine and R can be an alkyl or aryl group having from 1 to 6 carbon atoms.

10. The process of claim 9 wherein R is ethyl.

11. The process of claim 10 wherein the mole ratio of organoaluminum compound(s) to titanium tetrachloride in step (a) is about 1.0:1.0 to about 1.2:1.0, in step (b) about 0.9:1.0 to about 1.1:1.0 and the mole ratio of added ethyl aluminum dichloride to diethylaluminum chloride is about 0.0:1.0 to about 1.0:1.0.

12. The process of claim 11 wherein the mole ratio of organoaluminum compound(s) to titanium tetrachloride in each of steps (a) and (b) is about 1:1 and the mole ratio of added ethylaluminum dichloride to diethylaluminum chloride is about 0.1:1.

13. The process of claim 11 wherein the rate of addition in step (a) is about 0.08 m moles per liter per second and the rate of reduction in step (b) is about $2.5 \times 10^{-3}$ m moles per liter per second per m$^2$ of available preformed titanium trichloride surface area.

14. The process of claim 11 wherein the temperature in step (a) and (b) is about 0° C. and the temperature is raised to 65° C. in step (c) at the rate of about 1° per minute.

15. The process of claim 11 wherein from about 0.1 to about 0.3 moles of added ethylaluminum dichloride is in solution with the titanium tetrachloride prior to the addition of diethylaluminum chloride.

16. The process of claim 15 wherein from about 0.14 to about 0.2 moles per liter of added ethylaluminum dichloride is in solution with titanium tetrachloride prior to the addition of diethylaluminum chloride.

17. The process of claim 15 wherein all the added ethylaluminum dichloride is added with the diethylaluminum chloride to the titanium tetrahalide solution.

18. The process of claim 1 or 6 wherein the titanium trihalide product in the diluent obtained in step (b) is held at about 0° C. for about one to about two hours prior to step (c).

19. The process of claim 1 or 6 wherein the recovered titanium trihalide solids product are activated to violet-type crystalline titanium halide by one of heat treatment at an activating temperature, treating under activating conditions with chlorinated hydrocarbon or treating under activating conditions with titanium tetrachloride.

20. A process for producing titanium trihalide solids product catalyst component having an average particle size diameter greater than 35 microns and a narrow particle size distribution comprising:

(a) adding an organometallic reducing compound with stirring to a solution of titanium tetrahalide in a suitable diluent at a temperature of about −50° C. to about +10° C. and in a mole ratio of between about 1.0:3.0 to about 1.2:1.0 and at a rate such that the reduction of titanium tetrahalide to titanium trihalide is about 0.03 to about 0.2 m moles per liter per second to obtain titanium trihalide solids product in the diluent having a narrow particle size distribution and an average particle size greater than about 20 microns;

(b) continuously, simultaneously and slowly adding with stirring to the titanium trihalide solids product in the diluent an organometallic reducing compound and titanium tetrahalide in a mole ratio of about 1.0:3.0 to about 1.2:1.0, the simultaneous addition being made at a rate such that the reduction of titanium tetrahalide to titanium trihalide is about $6 \times 10^{-4}$ to about 0.02 m moles per liter per second per m$^2$ of available preformed titanium trihalide surface area until solids product of desired size are obtained;

(c) slowly raising the temperature to about 60° C. to about 70° C. and recovering titanium trihalide solids product;

(d) contacting the titanium trihalide solids product with a minor amount of an alpha-olefin having at least two carbon atoms under polymerization conditions to obtain a reduced titanium trihalide solids product containing about 1 to about 1,000 wt.% of prepolymerized alpha-olefin based on the weight of titanium trihalide; and (e) treating said prepolymerized reduced solid with one of (a) a chlorinated hydrocarbon having at least 2 carbon atoms and a Lewis base complexing agent or (b) TiCl$_4$ and a Lewis base complexing agent to convert the prepolymerized titanium trihalide reduced solid to a substantially non-friable highly active, crystalline prepolymerized trihalide composition.

21. The process of claim 20 wherein step (a) is followed by step (b) without interruption.

22. The process of claim 20 wherein the titanium halide is titanium chloride and the organometallic reducing compound is one of AlR$_3$, AlR$_2$X, AlRX$_2$ or R$_3$Al$_2$X$_3$, wherein R is a hydrocarbyl group having from 1 to 18 carbon atoms and X is a halogen atom.

23. The process of claim 22 wherein R is an alkyl or aryl group having from 1 to 6 carbon atoms and X is chlorine.

24. The process of claim 23 wherein R is ethyl.

25. The process of claim 20 wherein the titanium trihalide solids obtained in step (c) are directly contacted with the alpha-olefin under polymerization conditions.

26. A process for producing titanium trichloride solids product catalyst component having an average particle size diameter greater than 35μ and a narrow particle size distribution comprising:

(a) adding R$_2$AlX or mixtures thereof with RAlX$_2$ slowly and with stirring to a solution of titanium tetrachloride in a suitable diluent at a temperature from about −5° C. to about +10° C. and based on total moles of organoaluminum compound per mole of titanium tetrachloride in a mole ratio of between about 0.9:1.0 to about 1.2:1.0 and in the presence of about 0 to about 1.0 mole added RAlX$_2$ per mole of R$_2$AlX, 0.0 mole to all of added RAlX$_2$ being in solution with titanium tetrachloride prior to the addition of R$_2$AlX the remainder of added RAlX$_2$ being added with R$_2$AlX to the titanium tetrachloride solution, wherein R is a hydrocarbyl group having from 1 to 18 carbon atoms and X is a halogen atom, the rate of addition of the R$_2$AlX to the titanium tetrachloride solution being controlled to maintain the reduction of titanium tetrachloride to titanium trichloride at about 0.03 to about 0.2 m moles per liter per second whereby there is obtained titanium trichloride solids product in the diluent having a narrow particle size distribution and an average particle size greater than about $20\mu$;

(b) slowly, simultaneously and continuously adding with stirring to the titanium trichloride solids product in the diluent $R_2AlX$ or mixtures thereof with $RAlX_2$ and titanium tetrachloride at a mole ratio based on total moles organoaluminum compound per mole titanium tetrachloride of about 0.9:1.0 to about 1.2:1.0; wherein R and X are as defined above, and wherein the simultaneous and continuous addition is at a rate such that the reduction of titanium tetrahalide to titanium trihalide is about $6 \times 10^{-4}$ to about $7 \times 10^{-3}$ m moles per liter per second per $m^2$ of available preformed titanium halide surface area until solids product of desired size are obtained;

(c) slowly raising the temperature to about 60° C. to about 70° C. and recovering titanium trichloride solids product;

(d) contacting the $TiCl_3$ solids product with a minor amount of an alpha-olefin having at least two carbon atoms under polymerization conditions to obtain a reduced $TiCl_3$ solids product containing about 1 to about 1,000 wt.% or prepolymerized alpha-olefin based on the weight of $TiCl_3$; and (e) treating said prepolymerized reduced solid with one of (a) a chlorinated hydrocarbon having at least 2 carbon atoms and a Lewis base complexing agent or (b) $TiCl_4$ and a Lewis base complexing agent to convert the prepolymerized $TiCl_3$ reduced solid to a substantially non-friable highly active, crystalline prepolymerized $TiCl_3$ composition.

27. The process of claim 26 wherein step (a) is followed by step (b) without interruption.

28. The process of claim 26 wherein X is chlorine and R can be an alkyl or aryl group having from 1 to 6 carbon atoms.

29. The process of claim 28 wherein R is ethyl.

30. The process of claim 29 wherein the mole ratio of organoaluminum compounds to titanium tetrachloride in step (a) is about 1.0:1.0 to about 1.2:1.0, in step (b) about 0.9:1.0 to about 1.1:1.0 and the mole ratio of ethylaluminum dichloride to diethylaluminum chloride is about 0.0:1.0 to about 1.0:1.0.

31. The process of claim 26 wherein said alpha-olefin contains from 2 to 22 carbon atoms said alpha-olefin containing no branching on the vinylic carbon atom and is present in amounts so as to provide a $TiCl_3$ solid product prepolymerized with about 3 wt.% to about 100 wt.% of said alpha-olefin based on the weight of $TiCl_3$.

32. The process of claim 31 wherein said alpha-olefin has from 3 to 8 carbon atoms and is present in amounts so as to provide a reduced solid $TiCl_3$ product prepolymerized with about 6 wt.% to 30 wt.% of said alpha-olefin based on the weight of $TiCl_3$.

33. The process of claim 26 wherein said prepolymerized $TiCl_3$ reduced solid is treated with the chlorinated hydrocarbon and Lewis base complexing agent.

34. The process of claim 33 wherein the treatment is at a temperature in the range of about 50° C. to about 100° C. for about 1 to about 10 hours, the chlorinated hydrocarbon being present in an amount at least about 0.2 mole per gram atom of titanium and the Lewis base being present in an amount of at least 0.1 mole per mole of titanium.

35. The process of claim 34 wherein the chlorinated hydrocarbon is present in an amount of about 0.5 mole to about 1.5 mole per gram atom of titanium in the prepolymerized reduced solid and the Lewis base is present in a range of about 0.1 mole to about 2.5 moles per mole titanium.

36. The process of claim 26 wherein said Lewis base complexing agent is dialkyl ether.

37. The process of claim 33 wherein said chlorinated hydrocarbon has from 2 to 8 carbon atoms and is selected from chlorinated saturated hydrocarbons, chlorinated unsaturated hydrocarbons or mixtures thereof.

38. The process of claim 37 wherein said chlorinated hydrocarbon is selected from chlorinated aliphatic hydrocarbons, chlorinated aromatic hydrocarbons or mixtures thereof.

39. The process of claim 38 wherein said chlorinated hydrocarbon is selected from hexachloroethane, pentachloroethane, trichloroethane, dichloroethane, tetrachloroethane, hexachloropropane, pentachloropropane, tetrachloropropane, dichlorobutane and mixtures thereof.

40. The process of claim 36 wherein said complexing agent is selected from the group consisting of di-n-butyl ether, di-n-amyl ether, diisoamyl ether, di-n-heptyl ether, di-2-ethylhexyl ether or mixtures thereof.

41. The process of claim 39 wherein the chlorinated hydrocarbon is hexachloroethane.

42. The process of claim 40 wherein said complexing agent is di-n-butyl ether.

43. The process of claim 29 wherein the titanium trihalide solids obtained in step (c) are directly contacted with the alpha-olefin under polymerization conditions.

44. A catalyst system for the polymerization of olefins comprising:
(a) an organometal compound co-catalyst; and
(b) the $TiCl_3$ solids product obtained by the process of claim 19.

45. A catalyst system for the polymerization of olefins comprising:
(a) an organometal compound co-catalyst; and
(b) the $TiCl_3$ solids product obtained by the process of claim 20.

46. A catalyst system for the polymerization of olefins comprising:
(a) an organometal compound co-catalyst; and
(b) the $TiCl_3$ solids product obtained by the process of claim 21.

47. A catalyst system for the polymerization of olefins comprising:
(a) an organometal compound co-catalyst; and
(b) the $TiCl_3$ solids product obtained by the process of claim 22.

48. A catalyst system for the polymerization of olefins comprising:
(a) an organometal compound co-catalyst; and
(b) the $TiCl_3$ solids product obtained by the process of claim 23.

49. A catalyst system for the polymerization of olefins comprising:
(a) an organometal compound co-catalyst; and
(b) the $TiCl_3$ solids product obtained by the process of claim 24.

50. A catalyst system for the polymerization of olefins comprising:

(a) an organometal compound co-catalyst; and
(b) the TiCl₃ solids product obtained by the process of claim 25.

51. A catalyst system for the polymerization of olefins comprising:
(a) an organometal compound co-catalyst; and
(b) the TiCl₃ solids product obtained by the process of claim 26.

52. A catalyst system for the polymerization of olefins comprising:
(a) an organometal compound co-catalyst; and
(b) the TiCl₃ solids product obtained by the process of claim 27.

53. A catalyst system for the polymerization of olefins comprising:
(a) an organometal compound co-catalyst; and
(b) the TiCl₃ solids product obtained by the process of claim 28.

54. A catalyst system for the polymerization of olefins comprising:
(a) an organometal compound co-catalyst; and
(b) the TiCl₃ solids product obtained by the process of claim 29.

55. A catalyst system for the polymerization of olefins comprising:
(a) an organometal compound co-catalyst; and
(b) the TiCl₃ solids product obtained by the process of claim 30.

56. A catalyst system for the polymerization of olefins comprising:
(a) an organometal compound co-catalyst; and
(b) the TiCl₃ solids product obtained by the process of claim 31.

57. A catalyst system for the polymerization of olefins comprising:
(a) an organometal compound co-catalyst; and
(b) the TiCl₃ solids product obtained by the process of claim 32.

58. A catalyst system for the polymerization of olefins comprising:
(a) an organometal compound co-catalyst; and
(b) the TiCl₃ solids product obtained by the process of claim 33.

59. A catalyst system for the polymerization of olefins comprising:
(a) an organometal compound co-catalyst; and
(b) the TiCl₃ solids product obtained by the process of claim 34.

60. A catalyst system for the polymerization of olefins comprising:
(a) an organometal compound co-catalyst; and
(b) the tiCl₃ solids product obtained by the process of claim 35.

61. A catalyst system for the polymerization of olefins comprising:
(a) an organometal compound co-catalyst; and
(b) the TiCl₃ solids product obtained by the process of claim 36.

62. A catalyst system for the polymerization of olefins comprising:
(a) an organometal compound co-catalyst; and
(b) the TiCl₃ solids product obtained by the process of claim 37.

63. A catalyst system for the polymerization of olefins comprising:
(a) an organometal compound co-catalyst; and
(b) the TiCl₃ solids product obtained by the process of claim 38.

64. A catalyst system for the polymerization of olefins comprising:
(a) an organometal compound co-catalyst; and
(b) the TiCl₃ solids product obtained by the process of claim 39.

65. A catalyst system for the polymerization of olefins comprising:
(a) an organometal compound co-catalyst; and
(b) the TiCl₃ solids product obtained by the process of claim 40.

66. A catalyst system for the polymerization of olefins comprising:
(a) an organometal compound co-catalyst; and
(b) the TiCl₃ solids product obtained by the process of claim 41.

67. A catalyst system for the polymerization of olefins comprising:
(a) an organometal compound co-catalyst; and
(b) the TiCl₃ solids product obtained by the process of claim 42.

68. A catalyst system for the polymerization of olefins comprising:
(a) an organometal compound co-catalyst; and
(b) the TiCl₃ solids product obtained by the process of claim 43.

* * * * *